United States Patent
Kramer

(10) Patent No.: US 12,489,935 B2
(45) Date of Patent: *Dec. 2, 2025

(54) AUTOMATED DYNAMIC DATA EXTRACTION, DISTILLATION, AND ENHANCEMENT

(71) Applicant: TORCH RESEARCH, LLC, Leawood, KS (US)

(72) Inventor: Jon Kramer, Leawood, KS (US)

(73) Assignee: Torch Research, LLC, Leawood, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,195

(22) Filed: Oct. 31, 2023

(65) Prior Publication Data
US 2024/0064350 A1 Feb. 22, 2024

Related U.S. Application Data

(63) Continuation of application No. 17/384,413, filed on Jul. 23, 2021, now Pat. No. 11,838,567.

(51) Int. Cl.
*H04N 21/2368* (2011.01)
*G06F 9/54* (2006.01)
(Continued)

(52) U.S. Cl.
CPC ......... *H04N 21/2368* (2013.01); *G06F 9/543* (2013.01); *G06N 20/00* (2019.01);
(Continued)

(58) Field of Classification Search
None
See application file for complete search history.

(56) References Cited

U.S. PATENT DOCUMENTS

| 8,078,677 B2 | 12/2011 | Mendiola |
| 8,209,396 B1 | 6/2012 | Raman et al. |

(Continued)

OTHER PUBLICATIONS

Office Action dated Nov. 12, 2021, U.S. Appl. No. 16/805,302, filed Feb. 28, 2020.

(Continued)

*Primary Examiner* — Hung Q Dang
(74) *Attorney, Agent, or Firm* — Conley Rose, P.C.; Michael W. Piper; Elexis A. Jones

(57) ABSTRACT

A dynamic data extraction, distillation, and enhancement system is disclosed that includes a dynamic extraction, distillation, and enhancement framework. The framework includes an allocator, extractor, and deconstructor stored in a non-transitory memory that, when executed by a processor, receive files in different formats from data sources, determine a native format of each file, identify and extract an embedded object from a file, deconstruct the file into components, assign each file to one of a plurality of streams based on the native format of the file, assign the embedded object to a stream based on a format of the embedded object, and assign a deconstructed component to a stream based on a format of the deconstructed component. The native format includes one of text, video, image, or audio. Each stream corresponds to one native format. The streams include a text stream, an audio stream, a video stream, and an image stream.

18 Claims, 4 Drawing Sheets

(51) Int. Cl.
  *G06F 16/245*    (2019.01)
  *G06N 20/00*     (2019.01)
  *H04N 21/232*    (2011.01)
  *H04N 21/233*    (2011.01)
  *H04N 21/2343*   (2011.01)
  *H04N 21/266*    (2011.01)
  *H04N 21/2665*   (2011.01)

(52) U.S. Cl.
  CPC ....... *H04N 21/2323* (2013.01); *H04N 21/233* (2013.01); *H04N 21/234318* (2013.01)

(56) References Cited

U.S. PATENT DOCUMENTS

| | | | |
|---|---|---|---|
| 8,799,257 B1* | 8/2014 | Hubinette | G06F 16/93 |
| | | | 707/706 |
| 9,317,566 B1 | 4/2016 | L'Huillier et al. | |
| 11,487,932 B2 | 11/2022 | Kramer | |
| 11,556,695 B2 | 1/2023 | Kramer | |
| 11,734,493 B2 | 8/2023 | Kramer | |
| 11,838,567 B2 | 12/2023 | Kramer | |
| 11,842,285 B2 | 12/2023 | Kramer | |
| 2002/0143547 A1* | 10/2002 | Fay | G06F 3/165 |
| | | | 704/270 |
| 2003/0115219 A1 | 6/2003 | Chadwick | |
| 2003/0169372 A1* | 9/2003 | Huang | H04N 5/44504 |
| | | | 348/E9.037 |
| 2006/0173985 A1 | 8/2006 | Moore | |
| 2008/0043144 A1* | 2/2008 | Amir | G06V 20/40 |
| | | | 382/305 |
| 2012/0167103 A1* | 6/2012 | Kim | G06F 9/5027 |
| | | | 718/102 |
| 2013/0044955 A1* | 2/2013 | Hirai | H04N 5/205 |
| | | | 382/190 |
| 2013/0094834 A1* | 4/2013 | Laksono | G06F 16/787 |
| | | | 386/E5.003 |
| 2014/0289643 A1 | 9/2014 | Shmunis et al. | |
| 2014/0358982 A1 | 12/2014 | Pareek et al. | |
| 2015/0067006 A1 | 3/2015 | Miglore | |
| 2015/0163561 A1 | 6/2015 | Grevers, Jr. | |
| 2015/0378984 A1 | 12/2015 | Ateya et al. | |
| 2016/0357987 A1* | 12/2016 | Heo | G06T 13/80 |
| 2019/0311576 A1* | 10/2019 | Green | G07F 17/3211 |
| 2019/0325259 A1 | 10/2019 | Murphy | |
| 2019/0332658 A1 | 10/2019 | Heckel et al. | |
| 2019/0384640 A1 | 12/2019 | Swamy et al. | |
| 2020/0153928 A1 | 5/2020 | Chauhan et al. | |
| 2020/0311616 A1 | 10/2020 | Rajkumar et al. | |
| 2021/0192387 A1 | 6/2021 | Benson et al. | |
| 2021/0256059 A1* | 8/2021 | Gan | G06N 3/049 |
| 2021/0271802 A1 | 9/2021 | Kramer | |
| 2021/0273965 A1 | 9/2021 | Pi et al. | |
| 2021/0279401 A1 | 9/2021 | Kramer | |
| 2021/0279402 A1 | 9/2021 | Kramer | |
| 2021/0279606 A1 | 9/2021 | Srinivasan et al. | |
| 2023/0029096 A1 | 1/2023 | Kramer | |
| 2023/0132243 A1* | 4/2023 | Mann | G06T 3/18 |
| | | | 386/278 |

OTHER PUBLICATIONS

Office Action dated Nov. 12, 2021, U.S. Appl. No. 17/326,812, filed May 21, 2021.
Office Action dated Nov. 23, 2021, U.S. Appl. No. 17/326,822, filed May 21, 2021.
Final Office Action dated Jun. 2, 2022, U.S. Appl. No. 16/805,302, filed Feb. 28, 2020.
Notice of Allowance dated Apr. 3, 2023, U.S. Appl. No. 16/805,302, filed Feb. 28, 2020.
Final Office Action dated Jun. 2, 2022, U.S. Appl. No. 17/326,812, filed May 21, 2021.
Notice of Allowance dated Oct. 25, 2022, U.S. Appl. No. 17/326,812, filed May 21, 2021.
Notice of Allowance dated Jun. 13, 2022, U.S. Appl. No. 17/326,822, filed May 21, 2021.
Notice of Allowance dated Jul. 22, 2022, U.S. Appl. No. 17/326,822, filed May 21, 2021.
Office Action dated Jun. 6, 2023, U.S. Appl. No. 17/384,413, filed Jul. 23, 2021.
Notice of Allowance dated Jul. 31, 2023, U.S. Appl. No. 17/384,413, filed Jul. 23, 2021.
Office Action dated Jul. 11, 2022, U.S. Appl. No. 17/706,341, filed Mar. 28, 2022.
Final Office Action dated Oct. 21, 2022, U.S. Appl. No. 17/706,341, filed Mar. 28, 2022.
Office Action dated Feb. 17, 2023, U.S. Appl. No. 17/706,341, filed Mar. 28, 2022.
Advisory Action dated Jan. 17, 2023, U.S. Appl. No. 17/706,341, filed Mar. 28, 2022.
Notice of Allowance dated Jul. 28, 2023, U.S. Appl. No. 17/706,341, filed Mar. 28, 2022.
Advisory Action dated Aug. 25, 2022, U.S. Appl. No. 16/805,302, filed Feb. 28, 2020.
Advisory Action dated Aug. 25, 2022, U.S. Appl. No. 17/326,812, filed May 21, 2021.
Dessi, Danilo, et al., "Generating knowledge graphs by employing natural language processing and machine learning echniques within the scholarly domain," Future Generation Computer Systems 116 (2021): 253-264. (Year: 2020).
Kramer, Jon, "Graph Database Implemented Knowledge Mesh", filed Oct. 30, 2023, U.S. Appl. No. 18/497,823.

* cited by examiner

AUTOMATED DYNAMIC DATA EXTRACTION, DISTILLATION, AND ENHANCEMENT

CROSS-REFERENCE TO RELATED APPLICATIONS

This application is a continuation of and claims priority under 35 U.S.C. § 120 to U.S. patent application Ser. No. 17/384,413 filed Jul. 23, 2021, entitled "Automated Dynamic Data Extraction, Distillation, and Enhancement" by Jon Kramer, which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data processing is the collection and translation of data into usable information. In some cases, data processing may include processing a pool of stored data in batch all at once.

SUMMARY

In an embodiment, a dynamic data extraction, distillation, and enhancement system is disclosed. The system comprises a dynamic extraction, distillation, and enhancement framework comprising an allocator, one or more extractors, and one or more deconstructors stored in a non-transitory memory that, when executed by a processor, receives a plurality of files in a plurality of formats from one or more data sources, for each file of the plurality of files, determines a native format of the file, wherein the native format comprises one of text, audio, video, or image, and assign each file to one of a plurality of streams based on the native format of the file. Each of the plurality of streams corresponds to one native format, and wherein the plurality of streams comprises a text stream, an audio stream, a video stream, and an image stream. The allocator, the one or more extractors, and the one or more deconstructors, when executed by the processor, for one or more files of the plurality of files, identify and extract at least one embedded object of a different format than the native format of the file and, for each of the one or more files, assign the at least one embedded object of the different format to a corresponding stream of the plurality of streams based on the different format of the at least one embedded object. The allocator, the one or more extractors, and the one or more deconstructors, when executed by the processor, deconstruct at least one file of the plurality of files into a plurality of components, where at least one component of the plurality of components is of a different format than the native format of the at least one file, and assign the at least one component to a corresponding stream of the plurality of streams based on the different format of the at least one component. The system also comprises at least one text stream processor that processes text data from the text stream, adds attributes to the text data to create enhanced text data, and transmits the enhanced text data back into the text stream and at least one video stream processor that processes video data from the video stream, adds attributes to the video data to create enhanced video data, and transmits the enhanced video data back into the video stream. The system further comprises at least one image stream processor that processes image data from the image stream, adds attributes to the image data to create enhanced image data, and transmits the enhanced image data back into the image stream and at least one audio stream processor that processes audio data from the audio stream, adds attributes to the audio data to create enhanced audio data, and transmits the enhanced audio data back into the audio stream.

In another embodiment, a method of dynamic data extraction, distillation, and enhancement is disclosed. The method comprises receiving, by an allocator stored in a non-transitory memory and executable by a processor, a plurality of files in a plurality of formats from one or more data sources, for each file of the plurality of files, determining, by the allocator, a native format of the file, wherein the native format comprises one of text, audio, video, or image, and assigning, by the allocator, each file to one of a plurality of streams based on the native format of the file. Each of the plurality of streams corresponds to one native format, and wherein the plurality of streams comprises a text stream, an audio stream, a video stream, and an image stream. The method also comprises, for one or more files of the plurality of files, identifying and extracting, by one or more extractors stored in a non-transitory memory and executable by a processor, at least one embedded object of a different format than the native format of the file and assigning, by the allocator, the at least one embedded object of the different format to a corresponding stream of the plurality of streams based on the different format of the at least one embedded object. The method additionally comprises deconstructing, by one or more deconstructors stored in a non-transitory memory and executable by a processor, at least one file of the plurality of files into a plurality of components, where at least one component of the plurality of components is of a different format than the native format of the at least one file, and assigning, by the allocator, the at least one component to a corresponding stream of the plurality of streams based on the different format of the at least one component. The method further comprises processing data from each of the plurality of streams, adding, by a corresponding processor, attributes to the data to create enhanced data, and transmitting, by the corresponding processor, the enhanced data back into a corresponding stream. At least one text stream processor processes text data from the text stream, at least one video stream processor processes video data from the video stream, at least one image stream processor processes image data from the image stream, and at least one audio stream processor processes audio data from the audio stream.

In yet another embodiment, a method of dynamic data extraction, distillation, and enhancement is disclosed. The method comprises receiving, by an allocator stored in a non-transitory memory and executable by a processor, a plurality of files in a plurality of formats from one or more data sources, for each file of the plurality of files, determining, by the allocator, a native format of the file, wherein the native format comprises one of text, audio, video, or image, and assigning, by the allocator, each file to one of a plurality of streams based on the native format of the file. Each of the plurality of streams corresponds to one native format, and wherein the plurality of streams comprises a text stream, an audio stream, a video stream, and an image stream. The method also comprises for one or more files in the text stream, identifying, by one or more extractors stored in a non-transitory memory and executable by a processor, at least one embedded link to external data, accessing and retrieving, by the one or more extractors, the external data based on the at least one embedded link, and assigning, by the allocator, the external data to a corresponding stream of the plurality of streams based on a format of the external data. The method further comprises deconstructing, by one or more deconstructors stored in a non-transitory memory and executable by a processor, at least one file of the plurality of files into a plurality of components, where at least one component of the plurality of components is of a different format than the native format of the at least one file, and assigning, by the allocator, the at least one component to a corresponding stream of the plurality of streams based on the different format of the at least one component.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
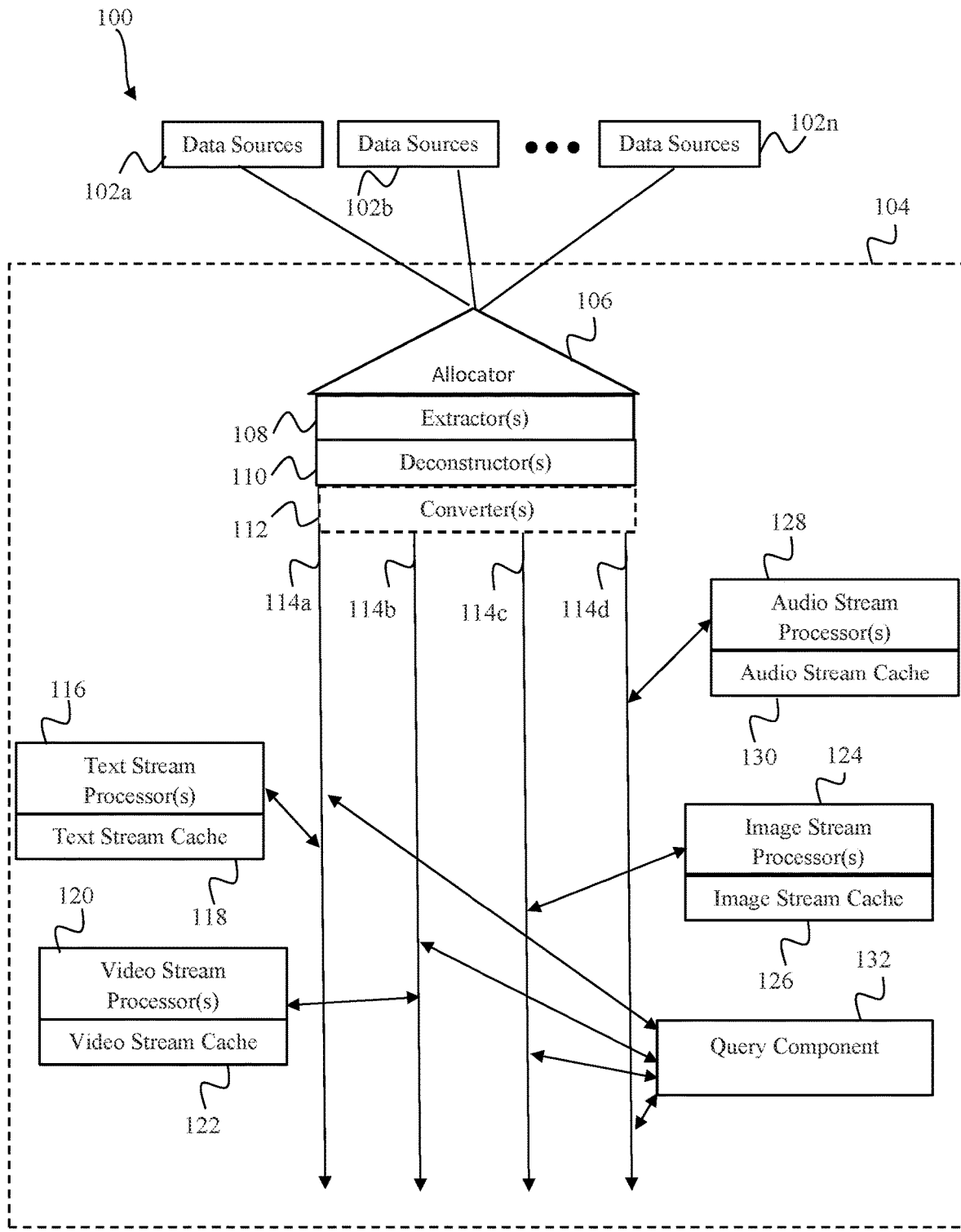
FIG. 1 is a block diagram of a dynamic data extraction, distillation, and enhancement system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Prior data analytics systems often analyzed pools of data stored in datastores and processed the data in batch. This can result in processing and resource inefficiencies. For example, with batch processing, processors may be executed to run different processes on every file in the batch even though certain processes may only be relevant to or intended for certain types of files. This may result in increased processing times as well as wasted resources.

The pending application is directed to a dynamic extraction, distillation, and enhancement framework. The framework disclosed herein separates the files received from data sources into logical streams based on a native format of the file. For example, text files may be assigned to a text stream, video files may be assigned to a video stream, image files may be assigned to an image stream, and audio files may be assigned to an audio stream. The framework may comprise heap memory and the various logical streams of data may be located within the heap memory.

The framework disclosed herein also identifies and extracts embedded objects from the files and assigns the embedded object to a particular stream based on a format of the embedded object. In some cases, the framework may identify and extract embedded links from the files, access and retrieve external data based on the embedded link, and assign the external data to a particular stream based on a format of the external data. The extracted data (i.e., the embedded object and/or the embedded link) may be attributed to the original file (e.g., via metadata).

The framework disclosed herein also deconstructs the files into components and assigns the components to a particular stream based on a format of the component. For example, an audio file can be converted to a text component and the text component assigned to the text stream. In another example, an image file may be deconstructed to a text component if for example there is text in a photograph and the text component assigned to the text stream. The deconstructed components may be attributed to the original file (e.g., via metadata). The identification and extraction of embedded and assignment of the embedded data to a corresponding stream as well as the deconstruction of the files into components and assignment of the components of the files to corresponding streams results in a functional improvement of prior analytic systems in that more data (and different data) is being analyzed and processed in particular ways based on the assigned stream, thereby leading to more robust data analytics.

Because of the separation of the files (as well as the embedded objects, the external data retrieved based on the embedded links, and/or the deconstructed components) into streams based on their native formats, the framework is able to process data from each stream in flight using particular processors particularly tuned to applying particular processes to the type of data in that stream, thereby resulting in more efficient processing and use of resources than the prior data analytic systems discussed above. For example, a text stream processor may be particularly tuned to process text data from the text stream and create enhanced text data by adding attributes to the text data and then place the enhanced text data back into the text stream. A video stream processor, an image stream processor, and an audio stream processor may similarly be particularly tuned to process data from the corresponding stream, create enhanced data, and transmit the enhanced data back to the corresponding stream. The attributes added to the data may include characteristics of the data being processed (e.g., an identity of a person, a location, a topic, etc.) and/or relationships of the corresponding data within and between files. The attributes may be added based on application of machine learning ("ML") models.

The framework and in particular the separation of files into streams based on their native formats also results in efficiencies to be gained in querying the data. For example, a query can be directed to a particular stream and structured a certain way based on the format of the data in that stream or a query can be directed to a combination of streams and structured differently based on the format of the data in each stream, thereby resulting in more faster, more targeted query results. In some cases, different variants of the query may be applied to different streams. For example, if a query is directed to locating data about a particular individual, the text stream may be searched for the name of the particular individual, the image stream may be searched for the image of the particular individual, the video stream may be searched for a video of the particular individual, and/or the audio stream may be searched for a voice print of the particular individual. Since the additional data (e.g., the embedded objects, the external data retrieved based on the embedded links, and/or the deconstructed components) is included in the streams, better, more robust query results can be produced.

A query may be directed to data at any point in the stream. For instance, a query may be directed to data in the stream prior to the data being processed by the stream processor and enhanced data created. Alternatively, a query may be directed to enhanced data in the stream after the data has been processed by the stream processor. In some cases, a query may drive an application of a particular process or ML model to create a more enhanced set of attributes associated with the data in the stream. For example, if a query is directed to locating data about a particular individual, and the query response determines that the particular individual is present in the data, the corresponding data pertaining to that particular individual in one or more streams may be processed by the respective stream processor(s) to create a more enhanced set of attributes corresponding to the data pertaining to the particular individual.

Turning to FIG. 1, a dynamic data extraction, distillation, and enhancement system 100 is described. The system 100 may comprise a plurality of data sources 102a, 102b, 102n and a dynamic data extraction, distillation, and enhancement framework 104. The data sources 102a, 102b, and 102n may be referred to as the data sources 102 below. The dynamic data extraction, distillation, and enhancement framework 104 may be referred to as the framework 104 below.

The framework 104 may comprise an allocator 106, one or more extractors 108, and one or more deconstructors 110. In some embodiments, the framework 104 may also comprise one or more converters 112. Each of the components (i.e., the allocator 106, extractor(s) 108, deconstructor(s) 110, and converter(s) 112) may be stored in a non-transitory memory executable by a processor to perform certain functions. While illustrated in FIG. 1 as separate components, each of the allocator 106, extractor(s) 108, deconstructor(s) 110, and converter(s) 112 may be part of a single software routine. Additionally, while listed in FIG. 1 as the allocator 106 first, then extractor(s) 108, followed by deconstructor(s) 110, and sometimes followed by converter(s) 112, the functions performed by those components or software subroutines may be executed in a different order and/or the software subroutines may be intermixed.

The data sources 102 may comprise live, real-time data or older, stored data. The data included in the data sources 102 may be in the form of data files or documents. The allocator 106 may receive data files from the data sources 102 and determine a native format of each file. The native format for each file may comprise one of text, audio, video, image, or another native format. In one embodiment, a text file may include only a link (e.g., a URL). The allocator 106 may assign each file to one of a plurality of streams 114a-114d based on the native format of the file. Each of the streams 114a-114d may correspond to one native format. For example, stream 114a may correspond to a text stream, stream 114b may correspond to a video stream, stream 114c may correspond to an image stream, and stream 114d may correspond to an audio stream. Hereinafter streams 114a, 114b, 114c, and 114d may be referred to as the text stream 114a, the video stream 114b, the image stream 114c, and the audio stream 114d respectively. Also, in some cases, streams 114a, 114b, 114c, and 114d may be referred to as the streams 114 below. While only four streams are listed in FIG. 1, additional streams may be present without departing from the spirit or scope of the disclosure.

In an embodiment, the streams 114 are logical streams. The allocator 106 may assign a file to one of the streams 114 by marking or tagging the file as associated to a particular stream 114a-114d. For instance, the allocator 106 may determine that a native file format of a first file is text, a native file format of a second file is video, a native file format of a third file is image, and a native file format of a fourth file is audio, and the allocator 106 may assign the first file to the text stream 114a by marking or tagging the first file as associated to the text stream 114a, the second file to the video stream 114b by marking or tagging the second file as associated to the video stream 114b, the third file to the image stream 114c by marking or tagging the third file as associated to the image stream 114c, and the fourth file to the audio stream 114d by marking or tagging the fourth file as associated to the audio stream 114d. The framework 104 may comprise heap memory (not illustrated in FIG. 1), and the streams 114 of data may be located within the heap memory.

Some of the files received from the data sources 102 may include embedded objects. The extractor(s) 108 may identify and extract an embedded object. In an embodiment, the embedded object is of a different format than the native format of the file in which the object was embedded. Extract as used herein may refer to copying the embedded object rather than removing the embedded object from the original file. The allocator 106 may assign the embedded object to one of the streams 114 based on the different format of the embedded object. For example, a text file may include a video embedded object, an image embedded object, and/or an audio embedded object. The extractor(s) 108 may identify and extract the video embedded object, identify and extract the image embedded object, and/or identify and extract the audio embedded object. The allocator 106 may assign the video embedded object to the video stream 114b, the image embedded object to the image stream 114c, and/or the audio embedded object to the audio stream 114d while the initial text file is assigned to the text stream 114a since the native format of the file was text. Each of the embedded objects may be attributed to its original file. For instance, each of the embedded objects may be tagged to reference its original file such that the source of the data is identifiable.

In some embodiments, one or more of the files received from the data sources 102 may comprise only a link (e.g., a URL). In such embodiments, the extractor(s) 108 may access and retrieve the external data based on the link, and the allocator 106 may assign the external data to a corresponding stream of the plurality of streams based on the format of the external data. The external data may be attributed to its original text file (e.g., the URL). For instance, the external data may be tagged to reference its original file such that the source of the external data is identifiable.

The deconstructor(s) 110 may deconstruct each file into a plurality of different components. In an embodiment, the deconstructed components are a different format than the native format of the file. For example, the deconstructor(s) 110 may deconstruct a video file into an audio component and a video component. In another example, the deconstructor(s) 110 may deconstruct an image file into a text component if the image includes text. In some embodiments, deconstruction could include a conversion by the converter(s) 112. For instance, with an audio file, audio data in the audio file may be converted by the converter(s) 112 into a text component. Each of the deconstructed components may be attributed to its original file. For instance, each of the deconstructed component may be tagged to reference its original file such that the source of the data is identifiable. After deconstruction of a file, the allocator 106 may assign each of the components of the file to a corresponding stream 114a-114d based on the format of each component. The identification and extraction of embedded data (e.g., embedded object or link) and assignment of the embedded data to a corresponding stream 114a-114d as well as the deconstruction of the files in components and assignment of the components of the files to corresponding streams 114 results in a functional improvement of prior analytic systems in that more data (and different data) is being analyzed and processed in particular ways based on the assigned stream, thereby leading to more robust data analytics.

In some embodiments, the files in each of the streams 114 may be in certain preferred file types. If an incoming file is not in one of the preferred file types, prior to assigning the incoming file to a stream 114a-114d based on the native format of the incoming stream, the converter(s) 112 may convert the incoming file to a different file type than the file type of the incoming file. For example, if the preferred video file type is MP4, any video file received by the allocator 106 that is not an MP4 may be converted by the converter(s) 112 to MP4 and then fed into the video stream 114b.

Because of the separation of the files (as well as the embedded objects, the external data retrieved based on the embedded links, and/or the deconstructed components) into streams 114 based on their native formats, the framework 104 is able to process data from each stream 114a-114d in flight using particular processors specifically tuned to applying particular processes to the type of data in that stream 114a-114d, thereby resulting in more efficient processing and use of resources. For example, the framework 104 may comprises one or more text stream processors 116 and an associated text stream cache 118, one or more video stream processors 120 and an associated video stream cache 122, one or more image stream processors 124 and an associated image stream cache 126, and one or more audio stream processors 128 and an associated audio stream cache 130. The text stream cache 120 may temporarily store text data from the text stream 114a while the text stream processor(s) 116 process the text data. Processing the text data may comprise applying one or more processes and/or one or more machine learning ("ML") models to the text data and adding attributes to the text data to create enhanced text data. The text stream processor(s) 116 may transmit the enhanced text data back into the text stream 114a. In an embodiment, the text stream processor(s) 116 are particularly tuned or optimized to process text data while the text stream cache 118 is particularly tuned or optimized to temporarily store text data.

Additional text stream processor(s) 116 may be spun up to execute a plurality of processes on text data from the text stream 114a in parallel. After the processes are completed, the additional text stream processor(s) 116 may be torn down. In some embodiments, additional text stream processor(s) 116 may be spun up in response to a volume of text data to be processed by the text stream processor 116 exceeding a predefined threshold. If the volume of text data to be processed falls below the predefined threshold, the additional text stream processor(s) 116 may be torn down.

The video stream cache 122 may temporarily store video data from the video stream 114b while the video stream processor(s) 120 process the video data. Processing the video data may comprise applying one or more processes and/or one or more machine learning ("ML") models to the video data and adding attributes to the video data to create enhanced video data. The video stream processor(s) 120 may transmit the enhanced video data back into the video stream 114b. In an embodiment, the video stream processor(s) 120 are particularly tuned or optimized to process video data while the video stream cache 122 is particularly tuned or optimized to temporarily store video data.

Additional video stream processor(s) 120 may be spun up to execute a plurality of processes on video data from the video stream 114b in parallel. After the processes are completed, the additional video stream processor(s) 120 may be torn down. In some embodiments, additional video stream processor(s) 120 may be spun up in response to a volume of text data to be processed by the video stream processor 120 exceeding a predefined threshold. If the volume of video data to be processed falls below the predefined threshold, the additional video stream processor(s) 120 may be torn down.

The image stream cache 126 may temporarily store image data from the image stream 114c while the image stream processor(s) 124 process the image data. Processing the image data may comprise applying one or more processes and/or one or more machine learning ("ML") models to the image data and adding attributes to the image data to create enhanced image data. The image stream processor(s) 124 may transmit the enhanced image data back into the image stream 114c. In an embodiment, the image stream processor(s) 124 are particularly tuned or optimized to process image data while the image stream cache 126 is particularly tuned or optimized to temporarily store image data.

Additional image stream processor(s) 124 may be spun up to execute a plurality of processes on image data from the image stream 114c in parallel. After the processes are completed, the additional image stream processor(s) 124 may be torn down. In some embodiments, additional image stream processor(s) 124 may be spun up in response to a volume of image data to be processed by the image stream processor 124 exceeding a predefined threshold. If the volume of image data to be processed falls below the predefined threshold, the additional image stream processor(s) 124 may be torn down.

The audio stream cache 130 may temporarily store audio data from the audio stream 114d while the audio stream processor(s) 128 process the audio data. Processing the audio data may comprise applying one or more processes and/or one or more machine learning ("ML") models to the audio data and adding attributes to the audio data to create enhanced audio data. The audio stream processor(s) 128 may transmit the enhanced audio data back into the audio stream 114d. In an embodiment, the audio stream processor(s) 128 are particularly tuned or optimized to process audio data while the audio stream cache 130 is particularly tuned or optimized to temporarily store audio data.

Additional audio stream processor(s) 128 may be spun up to execute a plurality of processes on audio data from the audio stream 114d in parallel. After the processes are completed, the additional audio stream processor(s) 128 may be torn down. In some embodiments, additional audio stream processor(s) 128 may be spun up in response to a volume of audio data to be processed by the audio stream processor 128 exceeding a predefined threshold. If the volume of audio data to be processed falls below the predefined threshold, the additional audio stream processor(s) 128 may be torn down.

The attributes added to the data during processing may comprise characteristics of the data being processed such as an identity of a person in particular data being processed, a location in the particular data, a topic associated with the particular data, or another characteristic. The attributes added to the data during processing may also comprise relationships of the data within and between files.

The framework 104 may also comprise a query component 132. The query component 132 may receive a query, process the query by applying one or more filters to one or more streams 114, and then return a response to the query based on the processing. The framework 104 and in particular the separation of files into streams 114 based on their native formats results in efficiencies to be gained in querying the data. For example, a query can be directed to a particular stream 114a-114d and structured a certain way based on the format of the data in that stream 114a-114d or a query can be directed to a combination of streams 114a-114d and structured differently based on the format of the data in each stream 114a-114d, thereby resulting in more faster, more targeted query results. In some cases, different variants of the query may be applied to different streams 114a-114d. For example, if a query is directed to locating data about a particular individual, the text stream 114a may be searched for the name of the particular individual, the image stream 114b may be searched for the image of the particular individual, the video stream 114c may be searched for a video of the particular individual, and/or the audio stream 114d may be searched for a voice print of the particular individual. Since the additional data (e.g., the embedded objects, the external data retrieved based on the embedded links, and/or the deconstructed components) is included in the streams 114a-114d, better, more robust query results can be produced by the framework 104.

A query may be directed to data at any point in the stream 114a-114d. For instance, a query may be directed to data in the stream 114a-114d prior to the data being processed by the corresponding stream processor 116, 120, 124, 128 and enhanced data created. Alternatively, a query may be directed to enhanced data in the stream 114a-114d after the data has been processed by the corresponding stream processor 116, 120, 124, 128. In some cases, a query may drive an application of a particular process or ML model to create a more enhanced set of attributes associated with the data in the stream 114a-114d. For example, if a query is directed to locating data about a particular individual, and the query response determines that the particular individual is present in the data, the corresponding data pertaining to that particular individual in one or more streams 114a-114d may be processed by the respective stream processor(s) 116, 120, 124, 128 to create a more enhanced set of attributes corresponding to the data pertaining to the particular individual.

In an embodiment, in addition to the text stream 114a, the video stream 114b, the image stream 114c, and the audio stream 114d, the framework may also comprise a person stream (not illustrated in FIG. 1). In this embodiment, the extractor(s) 108 identity a person in a video file or image file and extract at least a portion of data representing the person in the file. For instance, the extractor(s) 108 may extract a face of the person in the file or the entire person such that other characteristics of the person can be analyzed. The allocator 106 may then assign the portion of the data representing the person to the person stream, and the portion of the data representing the person may be attributed to the original file and tagged with other relevant contextual information (e.g., what time the person appears in the video, what camera captured the image or video, etc.). Facial recognition techniques may then be applied to data in the person stream resulting in quicker, more efficient results since the extraneous data from the file is not included in the person stream.

In a similar example, an audio file may include people talking as well as environmental noise. Depending on the context, the extractor(s) 108 may extract the environmental noise data and place the environmental noise data in the audio stream 114d or a dedicated environmental noise stream (not illustrated in FIG. 1). Analysis can then be more efficiently performed on the more focused environmental noise data. Alternatively or additionally, the extractor(s) 108 may extract the voice data and place the voice data in the audio stream 114d or a dedicated voice stream (not illustrated in FIG. 1). Analysis can then be more efficiently performed on the more focused voice data.

Figure 2A:
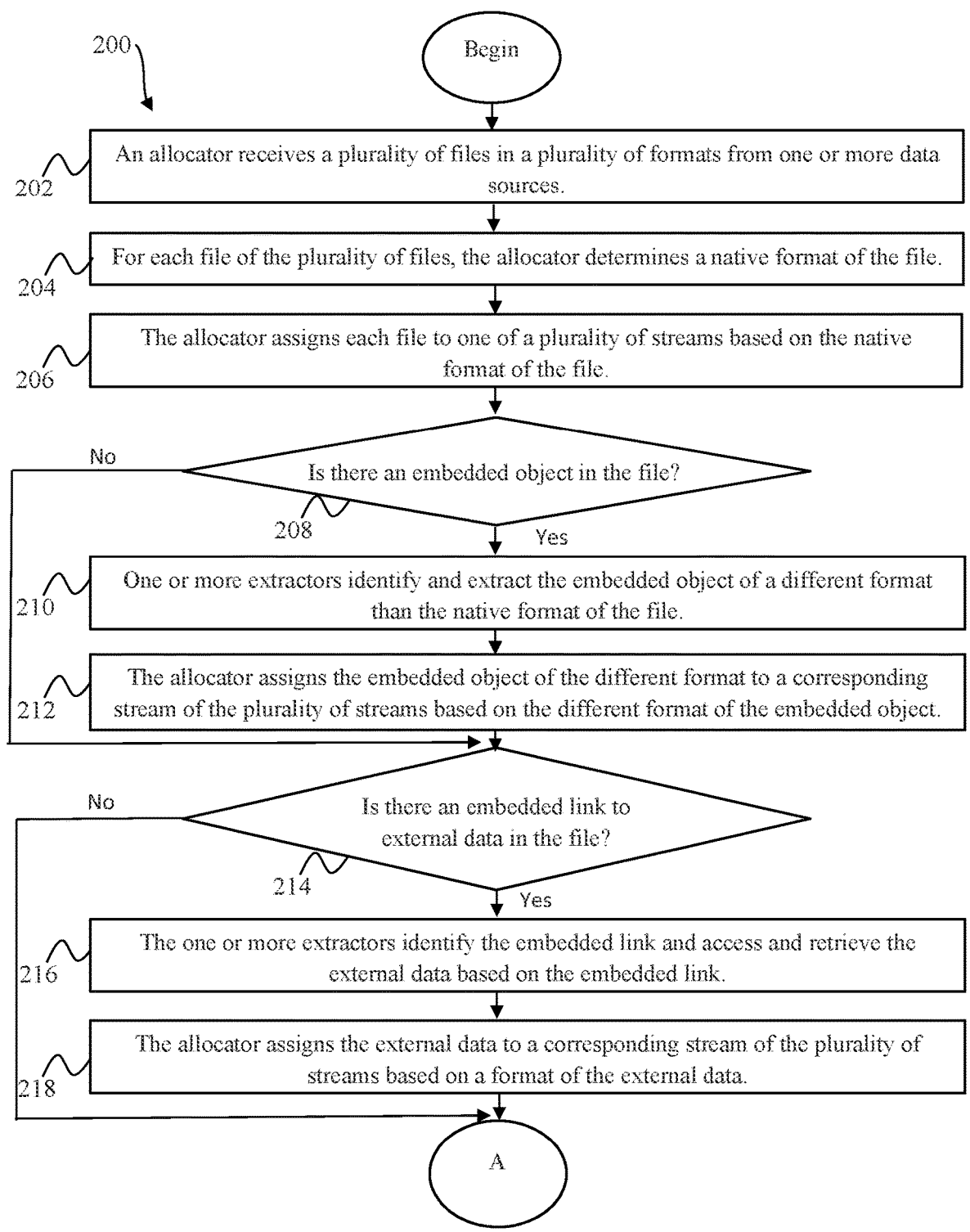
FIGS. 2A and 2B are a flow chart of a method according to an embodiment of the disclosure.
Figure 2B:
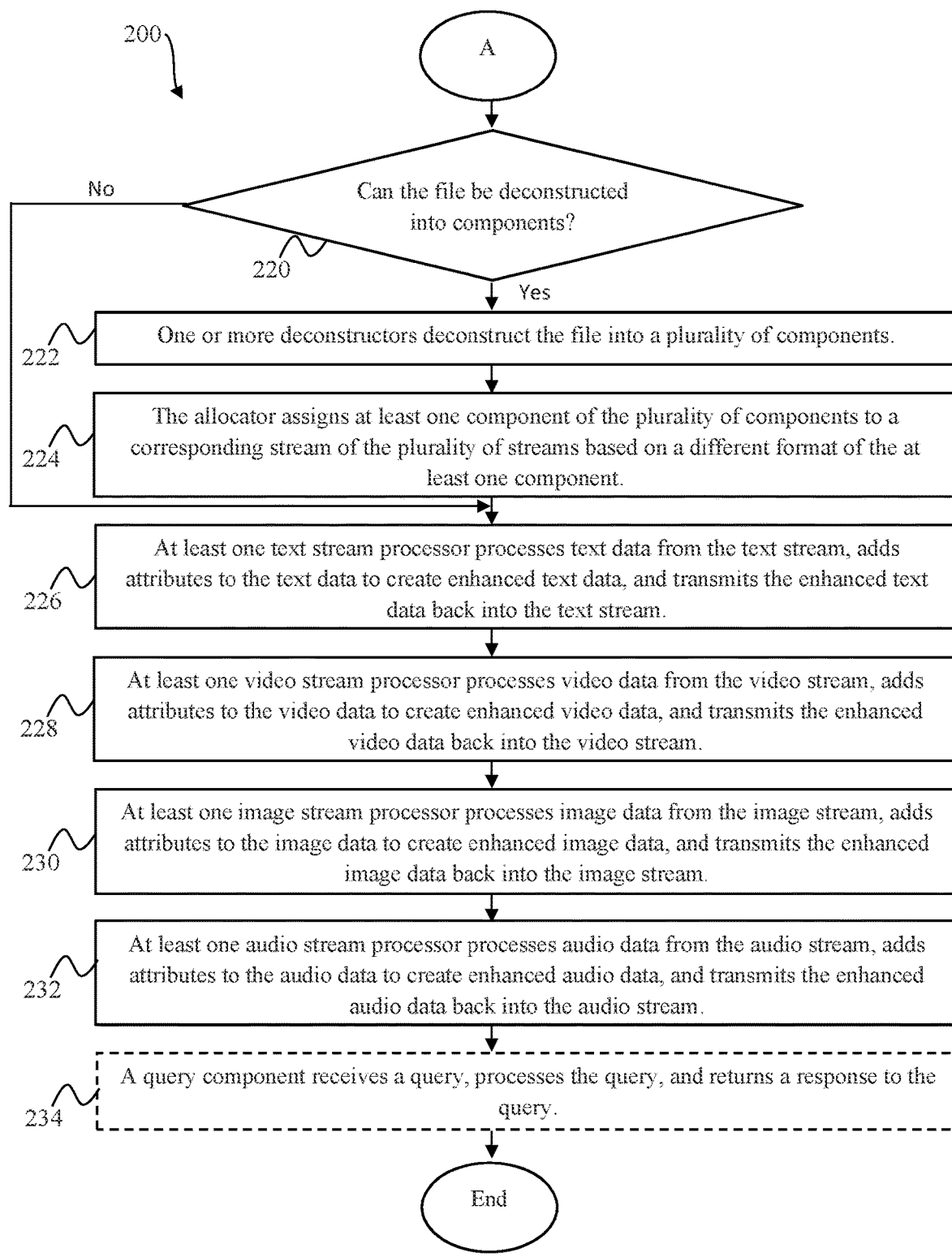

Turning now to FIGS. 2A and 2B, a dynamic data extraction, distillation, and enhancement method is described. At block 202, an allocator (e.g., allocator 106) receives a plurality of files in a plurality of formats from one or more data sources (e.g., data sources 102). At block 204, for each file of the plurality of files, the allocator determines a native format of the file. At block 206, the allocator assigns each file to one of a plurality of streams (e.g., streams 114) based on the native format of the file. At block 208, a determination is made (e.g., by extractor(s) 108) whether there is an embedded object in the file. If the file contains an embedded object, at block 210, one or more extractors (e.g., extractor(s) 108) identify and extract the embedded object of a different format than the native format of the file, and, at block 212, the allocator assigns the embedded object of the different format to a corresponding stream of the plurality of streams based on the different format of the embedded object.

At block 214, a determination is made (e.g., by extractor(s) 108) whether there is an embedded line to external data in the file. If the file contains an embedded link to external data, at block 216, the one or more extractors identify the embedded link and access and retrieve the external data based on the embedded link, and at block 218, the allocator assigns the external data to a corresponding stream of the plurality of streams based on the format of the external data.

At block 220, a determination is made (e.g., by deconstructor(s) 110) whether the file can be deconstructed into components. If the file can be deconstructed, at block 222, one or more deconstructors (e.g., deconstructors 110) deconstruct the file into a plurality of components, and, at block 224, the allocator assigns at least one component of the plurality of components to a corresponding stream of the plurality of streams based on a different format of the at least one component.

At block 226, at least one text stream processor (e.g., text stream processor(s) 118) processes text data from the text stream (e.g., text stream 114a), adds attributes to the text data to create enhanced text data, and transmits the enhanced text data back into the text stream. At block 228, at least one video stream processor (e.g., video stream processor(s) 122) processes video data from the video stream (e.g., video stream 114b), adds attributes to the video data to create enhanced video data, and transmits the enhanced video data back into the video stream. At block 230, at least one image stream processor (e.g., image stream processor(s) 126) processes image data from the image stream (e.g., image stream 114c), adds attributes to the image data to create enhanced image data, and transmits the enhanced image data back into the image stream. At block 232, at least one audio stream processor (e.g., audio stream processor(s) 128) processes audio data from the audio stream (e.g., text stream 114d), adds attributes to the audio data to create enhanced audio data, and transmits the enhanced audio data back into the audio stream.

At optional block 234, a query component (e.g., query component 132) receives a query, processes the query, and returns a response to the query. While FIGS. 2A and 2B list the determination at block 208 before the determination at block 214 and the determination at block 220, those determinations and the corresponding steps related to the determination may occur any in order without departing from the spirit and scope of the present disclosure. For example, blocks 220-224 may occur before blocks 208-212 and blocks 214-218. In another example, blocks 214-218 may occur before blocks 220-224 and blocks 208-212.

Figure 3:
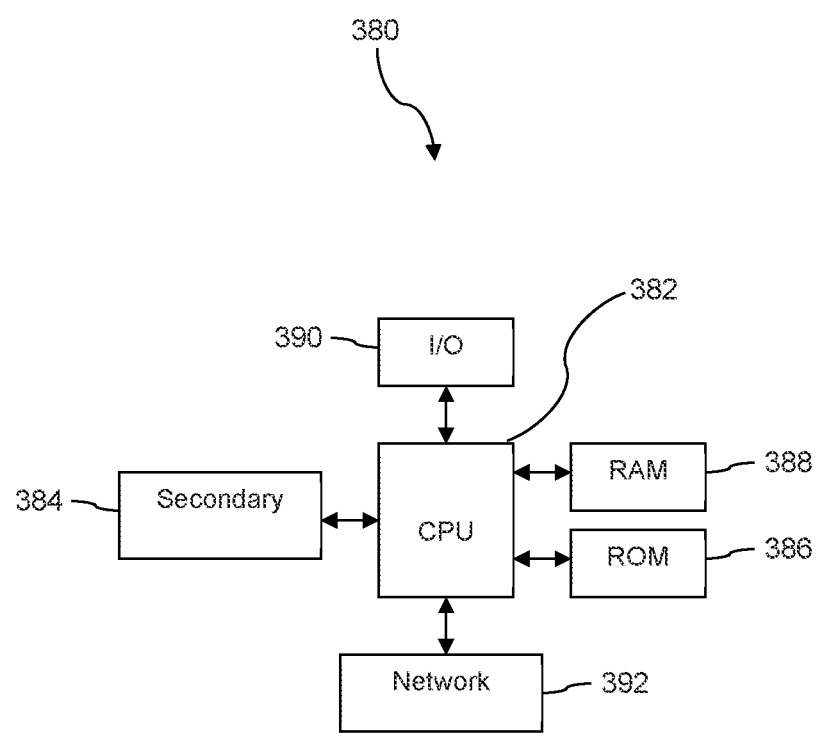
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dynamic data extraction, distillation, and enhancement system, comprising:
    a dynamic extraction, distillation, and enhancement framework comprising an allocator and one or more extractors stored in a non-transitory memory that, when executed by a processor:
    receive a plurality of files in a plurality of formats from one or more data sources, for a first file of the plurality of files, determine a native format of the first file,
assign the first file to a first stream of a plurality of streams based on the native format of the first file, wherein each of the plurality of streams corresponds to one native format,
for the first file of the plurality of files, identify and extract at least one embedded object of a different format than the native format of the first file,
assign the at least one embedded object of the different format to a second stream of the plurality of streams based on the different format of the at least one embedded object, wherein the first and second streams are different;
a first stream processor of a plurality of stream processors that processes data from the first stream, adds first attributes to the data from the first stream to create first enhanced data, and transmits the first enhanced data back into the first stream, wherein the first attributes comprise characteristics of the data being processed from the first stream;
a second stream processor of the plurality of stream processors that processes data including the at least one embedded object from the second stream, adds second attributes to the data including the at least one embedded object from the second stream to create second enhanced data, and transmits the second enhanced data back into the second stream, wherein the second attributes comprise characteristics of the data being processed from the second stream, and wherein the first attributes and the second attributes comprise machine-learning derived characteristics that create relationships between data within and across the plurality of streams; and
a query component stored in a non-transitory memory that, when executed by a processor:
receives a query directed to at least the first stream and the second stream after the first enhanced data is transmitted back into the first stream and the second enhanced data is transmitted back into the second stream,
processes the query by applying one or more filters to data including the first enhanced data in the first stream and the second enhanced data in the second stream, and
returns a response to the query based on the processing of the query, wherein the response includes results based on at least the first and second attributes added by the first and second stream processors.

2. The system of claim 1, wherein the native format comprises text, audio, video, or image, and wherein the plurality of streams comprises at least two of a text stream, an audio stream, a video stream, or an image stream.

3. The system of claim 1, wherein the first and second attributes comprise relationships of the data within and between files, and wherein the first and second attributes comprise one or more of an identity of a person in a particular data being processed, a location in the particular data, or a topic associated with the particular data.

4. The system of claim 1, wherein processing the data from the first stream and adding the first attributes to the data from the first stream comprises applying at least a first machine learning ("ML") model to the data from the first stream, and wherein processing the data from the second stream and adding the attributes to the data from the second stream comprises applying at least a second ML model to the data from the second stream.

5. The system of claim 1, further comprising:
a plurality of stream caches, each stream cache associated with one of the plurality of stream processors and optimized to temporarily store the data while a corresponding stream processor processes the data.

6. The system of claim 1, wherein the at least one embedded object is attributed to the first file.

7. A method of dynamic data extraction, distillation, and enhancement, the method comprising:
receiving, by an allocator stored in a non-transitory memory and executable by a processor, a plurality of files in a plurality of formats from one or more data sources;
for a first file of the plurality of files, determining, by the allocator, a native format of the first file;
assigning, by the allocator, the first file to a first stream of a plurality of streams based on the native format of the first file, wherein each of the plurality of streams corresponds to one native format;
for the first file of the plurality of files, identifying and extracting, by one or more extractors stored in a non-transitory memory and executable by a processor, at least one embedded object of a different format than the native format of the first file;
assigning, by the allocator, the at least one embedded object of the different format to a second stream of the plurality of streams based on the different format of the at least one embedded object, wherein the first and second streams are different;
processing, by a first stream processor, data from the first stream;
adding, by the first stream processor, first attributes to the data from the first stream to create first enhanced data, wherein the first attributes comprise characteristics of the data being processed from the first stream;
transmitting, by the first stream processor, the first enhanced data back into the first stream;
processing, by a second stream processor, data including the at least one embedded object from the second stream;
adding, by the second stream processor, second attributes to the data including the at least one embedded object from the second stream to create second enhanced data, wherein the second attributes comprise characteristics of the data being processed from the second stream, and wherein the first attributes and the second attributes comprise machine-learning derived characteristics that create relationships between data within and across the plurality of streams;
transmitting, by the second stream processor, the second enhanced data back into the second stream;
receiving, by a query component, a query directed to at least the first stream and the second stream after the first enhanced data is transmitted back into the first stream and the second enhanced data is transmitted back into the second stream;
processing, by the query component, the query by applying one or more filters to data including the first enhanced data in the first stream and the second enhanced data in the second stream; and
returning, by the query component, a response to the query based on the processing of the query, wherein the response includes results based on the first and second attributes added by the first and second stream processors.

8. The method of claim 7, wherein the native format comprises text, audio, video, or image, and wherein the plurality of streams comprises at least two of a text stream, an audio stream, a video stream, or an image stream.

9. The method of claim 7, wherein the first and second attributes comprise relationships of the data within and between files, and wherein the first and second attributes comprise one or more of an identity of a person in the data, a location in the data, or a topic associated with the data.

10. The system of claim 7, wherein processing the data from the first stream or the second stream comprises applying at least one machine learning ("ML") model to the data from the first stream or the second stream, and wherein adding the first attributes to the data from the first stream or adding the second attributes to the data from the second stream comprises applying at least one ML model to the data from the first stream or the second stream.

11. The method of claim 7, further comprising:
in a file whose native format is a video or an image,
identifying, by the one or more extractors, a person in the file;
extracting, by the one or more extractors, at least a portion of data representing the person in the file; and
assigning, by the allocator, the at least the portion of the data representing the person in the file to a person stream of the plurality of streams, wherein the at least the portion of the data representing the person is attributed to the file.

12. A method of dynamic data extraction, distillation, and enhancement, the method comprising:
receiving, by an allocator stored in a non-transitory memory and executable by a processor, a plurality of files in a plurality of formats from one or more data sources;
for a first file of the plurality of files, determining, by the allocator, a native format of the first file;
assigning, by the allocator, the first file to a first stream of a plurality of streams based on the native format of the first file, wherein each of the plurality of streams corresponds to one native format;
for the first file in the first stream, identifying, by one or more extractors stored in a non-transitory memory and executable by a processor, at least one embedded link to a first external data;
accessing and retrieving, by the one or more extractors, the external data based on the at least one embedded link;
assigning, by the allocator, the external data to a second stream of the plurality of streams based on a format of the external data, wherein the first stream and the second stream are different;
processing, by a first stream processor of a plurality of stream processors, data from the first stream;
adding, by the first stream processor, first attributes to the data from the first stream to create first enhanced data, wherein the first attributes comprise characteristics of the data being processed from the first stream;
transmitting, by the first stream processor, the first enhanced data back into the first stream;
processing, by a second of the plurality of stream processors, data including the external data from the second stream;
adding, by the second stream processor, second attributes to the data including the external data from the second stream to create second enhanced data, wherein the second attributes comprise characteristics of the external data being processed from the first stream, and wherein the first attributes and the second attributes comprise machine-learning derived characteristics that create relationships between data within and across the plurality of streams;
transmitting, by the second stream processor, the second enhanced data back into the second stream;
receiving, by a query component, a query directed to at least the first stream and the second stream after the first enhanced data is transmitted back into the first stream and the second enhanced data is transmitted back into the second stream;
processing, by the query component, the query by applying one or more filters to data including the first enhanced data in the first stream and the second enhanced data in the second stream; and
returning, by the query component, a response to the query based on the processing of the query, wherein the response includes results based on the first and second attributes added by the first and second stream processors.

13. The method of claim 12, wherein the native format comprises text, audio, video, or image, and wherein the plurality of streams comprises at least two of a text stream, an audio stream, a video stream, or an image stream.

14. The method of claim 12, wherein the plurality of stream processors comprise at least two of a text stream processor, a video stream processor, an image stream processor, or an audio stream processor.

15. The method of claim 12, further comprising spinning up additional stream processors to execute in parallel a plurality of processes on data from a stream.

16. The method of claim 12, further comprising spinning up additional stream processors in response to a volume of data to be processed by a stream processor exceeding a predefined threshold.

17. The method of claim 12, further comprising:
deconstructing, by one or more deconstructors stored in a non-transitory memory and executable by a processor, at least one file of the plurality of files into a plurality of components, wherein at least one component of the plurality of components is of a different format than the native format of the at least one file; and
assigning, by the allocator, the at least one component to a corresponding stream of the plurality of streams based on the different format of the at least one component.

18. The method of claim 12, wherein processing the data from the first stream or the second stream comprises applying at least one machine learning ("ML") model to the data from the first stream or the second stream, and wherein adding the first attributes to the data from the first stream or the second attributes to the data from the second stream comprises applying at least one ML model to the data from the first stream or the second stream.

* * * * *